(12) United States Patent
Tenckhoff

(10) Patent No.: US 11,150,123 B2
(45) Date of Patent: Oct. 19, 2021

(54) SYSTEM FOR MEASURING A FILLING LEVEL

(71) Applicant: ZF Friedrichshafen AG, Friedrichshafen (DE)

(72) Inventor: Georg Tenckhoff, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 154 days.

(21) Appl. No.: 16/535,922

(22) Filed: Aug. 8, 2019

(65) Prior Publication Data
US 2020/0056924 A1   Feb. 20, 2020

(30) Foreign Application Priority Data

Aug. 17, 2018 (DE) ...................... 10 2018 213 853.2

(51) Int. Cl.
*G01F 23/296* (2006.01)
*G01N 9/00* (2006.01)

(52) U.S. Cl.
CPC ...... *G01F 23/2962* (2013.01); *G01F 23/2966* (2013.01); *G01N 9/002* (2013.01)

(58) Field of Classification Search
CPC ............. G01F 23/2962; G01F 23/2966; G01F 23/2967
See application file for complete search history.

(56) References Cited

U.S. PATENT DOCUMENTS

| 2005/0217367 A1* | 10/2005 | Atkinson | ................ G01N 9/24 |
| | | | 73/290 V |
| 2016/0097703 A1* | 4/2016 | Pankratz | ............. G01N 29/222 |
| | | | 73/32 A |

FOREIGN PATENT DOCUMENTS

| DE | 37 38 515 A1 | 5/1989 |
| DE | 101 45 302 A1 | 4/2003 |
| DE | 102 58 598 A1 | 6/2004 |
| DE | 10 2010 014 5 | 10/2011 |
| JP | 2004-28592 A | 1/2004 |

OTHER PUBLICATIONS

German Search Report dated Jun. 24, 2019 for Application No. 010865-DE-NP, 12 pages.

* cited by examiner

*Primary Examiner* — Paul M. West
*Assistant Examiner* — Mark A Shabman
(74) *Attorney, Agent, or Firm* — Crowell & Moring LLP

(57) ABSTRACT

A system for measuring a filling level in a container for liquids that can be installed in a vehicle, which comprises a sound conductor, a vibration sensor for measuring a natural frequency of the sound conductor, a sound transmitter, in particular an ultrasound transmitter, for subjecting the sound conductor to sound, a sound receiver for receiving sound from the sound conductor, and an evaluation unit, which has a data connection to the sound transmitter and the sound receiver, wherein the evaluation unit is configured to determine a distance between the sound transmitter and a boundary surface of the liquid, and to evaluate the distance with regard to a filling level of the container, and to evaluate the natural frequency of the sound conductor with regard to a density of the liquid.

15 Claims, 6 Drawing Sheets

SYSTEM FOR MEASURING A FILLING LEVEL

CROSS-REFERENCE TO RELATED APPLICATIONS

This application claims priority from German Patent Application DE 10 2018 213 853.2, filed Aug. 17, 2018, the entirety of which is hereby fully incorporated by reference herein.

FIELD OF THE INVENTION

The present invention relates to a system for measuring a filling level in a container for a liquid, that is to be installed in a vehicle, and a method for measuring a filling level of a liquid in a container.

TECHNICAL BACKGROUND

The determination of the oil level by technological machines is a measure for ensuring functional lubrication, Known solutions range from dipsticks and gauge glasses through floats, to oil level sensors with an analog or digital output. Known principles make use of various possibilities for measuring the positions of floats, e.g. rotary potentiometers with levers and floats, floats on linear potentiometers, variations with cable pulls, floats with a magnetic inductive readout, or the measuring of the filling level of a cylindrical capacitor via the change in capacitance.

The prior art comprises sensors that determine the oil level with a sensor at a precise location in the oil. This approach works poorly when the oil forms a foam on its surface.

Furthermore, conventional tanks often have a specific track for detecting the oil, which can only be altered with a great deal of effort. By way of example, in pivotal lever potentiometers with floats, the track forms an arc segment with the pivotal lever. Ultrasound oil level sensors also require a straight path between a sound emitter and the surface of the oil. This frequently leads to design conflicts regarding the placement and functioning of the tank.

SUMMARY OF THE INVENTION

Based on this, the fundamental problem addressed by the invention is to produce a system for measuring a filling level, by means of which a density of a liquid can also be measured.

This problem is solved by a system for measuring a filling level in a container for liquids that is installed in a vehicle, that has the features of claim 1, and/or by a method for measuring a filling level of a liquid in a container that has the features of claim 17.

Accordingly, provided is:

a system for measuring a filling level in a container for liquids that is installed in a vehicle, which has a sound conductor, a vibration sensor for measuring a natural frequency of the sound conductor, a sound transmitter, in particular an ultrasound transmitter, for subjecting the sound conductor to sound, a sound receiver for receiving sound from the sound conductor, and an evaluation unit that has a data connection to the sound transmitter, the vibration sensor and the sound receiver, wherein the evaluation unit is configured to record a distance between the sound transmitter and a boundary surface of the liquid, and evaluate the distance with regard to the filling level of the container, and to evaluate the natural frequency of the sound conductor with regard to a density of the liquid; and a method for measuring a filling level of a liquid in a container comprising the following steps: generating a sound signal by means of a sound transmitter, and subjecting a sound conductor to the sound signal; receiving the returning sound signal with a sound receiver, which is transported from the sound conductor to the sound receiver; determining a distance between the sound transmitter and a boundary surface of the liquid based on the generated sound signal and the received sound signal; evaluating a distance with regard to the filling level of the container by an evaluation unit; determining a natural frequency of the sound conductor by a vibration sensor; evaluating the natural frequency with regard to the density of the liquid by the evaluation unit.

Vehicles as set forth in this patent application are motor powered land vehicles. This also includes rail vehicles.

Liquids are gases or fluids.

A sound conductor is an elastic medium for propagating sound. It is impossible to transmit sound in a vacuum.

The term "filling level" (also referred to as the "liquid level") refers to the level of a liquid, a fluid, or a bulk good in a container.

A sound transmitter emits an alternating pressure, thus a sound pressure, and thus generates sound waves. A vibration sensor is a sensor that measures a vibration. A sound receiver converts sound waves into electrical signals.

Sounds with frequencies above the hearing range of humans are referred to as ultrasound (often abbreviated as US). They comprises frequencies starting at approx. 16 kHz.

The natural frequency of a vibrating system is a frequency with which the system can vibrate naturally after it has been excited. When such a system is subjected to external vibrations having the same frequency as the natural frequency, the system reacts to weak damping with particularly large amplitudes, referred to as resonance.

An evaluation unit is used for computer-based evaluation of data by means of a processor.

Runtime is the time required for a signal to travel a distance. Runtime determination is a method for indirect distance or speed measurement by measuring the time required for a signal to travel the measurement distance.

The density is the quotient of the mass of a medium and its volume.

The boundary surface is the surface between two phases or media, e.g., the surface between two non-mixable liquids, such as oil and water, or between oil and gas.

A waveguide in this patent application is a sound conductor containing a hollow space. A solid in this patent application is a body containing no hollow spaces.

A tube or pipe is an elongated hollow body, the length of which is normally substantially greater than its diameter. In contrast to a hose, a tube is made of relatively rigid material. A hose is a flexible elongated hollow body with an arbitrary cross section.

Metals form those chemical elements in the periodic table at the left, beneath a separating line from boron to astatine.

A crystal is a solid body, the components of which—e.g. atoms, ions or molecules are arranged in a uniform crystalline structure. Known crystal line materials are table salt, sugar, minerals and snow—but also metals. Because of the uniform arrangement of the atoms or molecules, crystals have no continuous symmetry, but instead exhibit discrete symmetries. Crystalline refers to solids that contain crystals.

A compression wave, pressure wave, longitudinal wave, or compressional wave is a longitudinal wave in a liquid or solid. Brief fluctuations in the pressure in a medium are propagated as the wavefront. When the pressure fluctuates, the density fluctuates. A distinction is made between purely acoustic waves that have a slightly or moderately higher amplitude than the ambient pressure and a steady temporal pressure curve, and shock waves, in which the pressure changes abruptly, and the amplitude is usually comparatively large, e.g., a multiple of the ambient pressure, based on the type of change in pressure. Examples thereof are detonation waves and the sound barrier.

Torsion waves are sound waves that propagate in rod-shaped solids, wherein a twisting (torsion) takes place that is perpendicular to the direction of propagation.

A surface wave is a physical sound wave that propagates in a plane on a surface, thus in only two dimensions.

All of the waves described above are sound waves.

Coupling of a wave is understood to be a transference of the wave from a first medium to a second medium from the perspective of the second medium. Decoupling of a wave is understood to be the transference of the wave from a first medium to a second medium from the perspective of the first medium. Sound coupling is the transition capacity for sound from a first medium to a second medium.

A longitudinal reference marker in this patent application is a means in a sound conductor that acts on a natural frequency of the sound conductor such that it can be determined, based on the natural frequency of the sound conductor, whether the longitudinal reference marker has been excited with a vibration, or in which environmental medium the longitudinal reference marker is excited with a vibration.

Ribs in this patent application are relatively flat rises on a surface. Fins in this patent applications are relatively narrow rises on a surface.

A surface wrinkling is a region of a surface in which the surface is rougher than in a region surrounding the surface wrinkling.

The fundamental idea of the invention is to couple sound into a sound conductor that is in contact with the liquid that is to be measured, in particular a fluid, and another medium in a container, in particular air. If the sound conductor penetrates the boundary surface of the liquid, the coupling of the sound in the sound conductor into the region in which the sound conductor is surrounded by the liquid that is to be measured, differs from the coupling of the sound in the sound conductor into the region in which the sound conductor is surrounded by the other medium in the container. Because of the difference in the coupling of the sound waves propagated in the sound conductor, there is a disruption, by means of which the filling level in the container can be determined.

The sound conductor also has natural frequencies for different wavelengths, which are dependent on, among other things, the dimensions and temperature of the sound conductor, as well as the densities of the liquids or media surrounding the sound conductor. Accordingly, the natural frequency of the sound conductor allows for a mathematical determination of the density of the liquid.

With this resonance-based method, sensitive and non-sensitive regions can be measured, depending on the frequency, because sound with a higher particle velocity is better able to couple to the surroundings of the sound conductor than sound from a higher acoustic pressure. The particle velocity is the current speed of an oscillating particle.

Advantageous embodiments and further developments can be derived from the dependent claims and the description in reference to the figures in the drawings.

According to a preferred further development of the invention, the evaluation unit is configured to record a runtime between when the sound conductor is subjected to a sound, and when the sound is received from the sound conductor, and to evaluate the runtime with regard to the filling level of the container.

The runtime of the sound from the sound transmitter to the sound receiver is affected by the filling level of the liquid in the container or the position of the boundary surface of the liquid. Accordingly, the runtime can be used for mathematically determining the filling level.

Alternatively, the filling level can also be determined by means of interferometry. Interferometry refers to all of the measurement methods that make use of the overlapping or interference of waves in order to determine lengths that are to be measured. All of the effects that affect waves are thus available to it, and the structures of the necessary measurement devices, the interferometer, are accordingly manifold.

Alternatively, the filling level can also be determined by means of a spectroscopy of the time and frequency ranges. An actively or passively excited vibration that is dependent on the filling level is measured by a vibration sensor, such that the current filling level of the liquid tank can be derived from the comparison of the vibration to a reference signal, wherein the reference signal is determined with a defined filling level of the liquid tank.

According to a preferred further development of the invention, the sound conductor, sound transmitter and sound receiver can be placed in the container such that the sound is reflected by a boundary surface of the liquid back to the sound receiver during the runtime. Accordingly, the sound impulse is reflected by a boundary surface of the liquid that is to be measured. The reflected sound can be evaluated by the sound receiver, e.g. at the end of the sound conductor. In this manner, the position of the boundary surface can be determined. Accordingly, the evaluation unit can be configured to determine the distance between the sound transmitter and the reflection of the sound wave.

According to a preferred further development of the invention, the sound transmitter is configured to subject the sound conductor to sounds of various frequencies. The evaluation unit is also configured to detect a change in the natural frequency of the sound conductor. Accordingly, the sound conductor can be subjected to sounds in a frequency, spectrum, wherein the change in the natural frequency due to the change in the frequency of the sound is detected. This allows for a particularly reliable determination of the density of the liquid, because other factors can be eliminated such that the other factors no longer influence the results regarding the density of the liquid. A frequency spectrum can be generated by means of Fourier-transform infrared spectroscopy (FTIR spectroscopy). In this manner, a complex value impedance distribution along a one dimensional or multi-dimensional path can be determined.

According to a further development of the invention, the evaluation unit is configured to evaluate the natural frequency, in particular the change in the natural frequency, with regard to the nature of the boundary surface of a liquid. The nature of the boundary surface can, for example, be a foaming of the liquid that is to be measured. This is particularly advantageous, because a foamed liquid can distort the measurement results of a filling level measurement based purely on runtimes, or a filling level measurement by means of FTIR spectroscopy. It is understood that the density of a foamed liquid differs from the density of a liquid that is not foamed.

According to preferred further development of the invention, the sound conductor is in the form of a waveguide. Waveguides are advantageous, because they come in contact with the liquid that is to be measured on both the inside and the outside.

Accordingly, it can also be provided in this regard that the sound conductor is in the form of a hose and/or a tube, and can be placed in a container such that the sound conductor is in contact with the liquid inside and/or outside the sound conductor, when the container is filled with a liquid.

A flexible sound conductor allows for a great deal of design freedom, and a flexible sound conductor makes lower demands on installation space.

Alternatively, the sound conductor can be made of a solid material, i.e. in the form of a rod. In this regard, it is beneficial when the sound conductor is made of a material with low internal damping, e.g. a metal, a crystalline, or glass-like material.

Glass-like materials exhibit properties of liquid and solid states. Like liquids, glasses have no short-range order, thus no crystalline structure, and no plastic molecules, for example. Because of the absence of a crystalline structure, there are certain properties, such as a sharp-edged, brittle breaking behavior, as well as a slow flow, thus a slow yield of a substance subjected to a load. Typical substances with these properties, aside from glasses, are certain ceramics ("glass ceramics") and so-called metallic glasses. The latter are generated by quickly cooling melted metal, such that no (crystalline) order can be formed. Metallic glasses are frequently produced in thin layers.

According to a preferred further development of the invention, the sound transmitter is configured to subject the sound conductor to compression waves, and/or torsion waves, and/or surface waves. This is advantageous because the aforementioned waves can coupled particularly well into the surroundings of the waveguide. This improves the runtime-based filling level measurement.

According to a preferred further development of the invention, the system for measuring a filling level comprises numerous sound conductors, sound transmitters, and sound receivers, in particular three sound conductors, sound transmitters, and sound receivers, which are each configured to measure a filling level of a container at numerous, in particular three, measurement points. In this manner, a tilting of the container with respect to gravity, or a sloshing of the liquid in the container, can be taken into account. Consequently, distortion of the measurement is reduced in these cases.

According to a preferred further development of the invention, the sound conductor has at least one branching. In this manner, a tilting of the container with respect to gravity or a sloshing of the liquid in the container can likewise be accounted for. In this case, the sound transmitter can be located between two sound converters. Consequently, a distinct sound impulse can be coupled into a branching. As a result, the sound receiver can determine which branch a sound impulse has traveled through.

According to a preferred further development of the invention, the sound conductor is curved. As a result, additional tolerances are obtained with respect to the installation space for a system for measuring a filling level.

Furthermore, the sound conductor can be curved such that it penetrates a liquid in numerous places when the sound conductor is placed in a container filled with a liquid. By way of example, a sound conductor can be annular, U-shaped, or S-shaped. Accordingly, numerous runtimes can be measured with one sound conductor, specifically the runtime of the sound from the sound transmitter to the first penetration, and the runtime of the sound form the sound transmitter to the second penetration. As a result, the runtime measurement can be checked particularly easily. In particular, these variations can be configured, such that only one sound conductor, one sound transmitter, and one sound receiver are necessary for generating numerous runtime measurements.

According to a preferred further development of the invention, the sound conductor can be attached to at least one attachment point on a container, wherein the attachment point is configured in particular with respect to a coupling of interference waves outside the sound conductor and/or with regard to a decoupling of the sound to which the sound conductor is subjected. It may be beneficial to attach a sound conductor to numerous attachment points in a container, in particular when the sound conductor is flexible. Attachment points can also be used as longitudinal reference markers.

According to a preferred further development of the invention, the sound conductor has at least one longitudinal reference marker, which has an effect on the natural frequency of the sound conductor, wherein the longitudinal reference marker comprises a change in the cross section of the sound conductor in particular, specifically a tapering and/or widening of the sound conductor. As a result, a longitudinal reference marker can be used to generate distinct measurement results. Longitudinal reference markers are particularly advantageous when the primary objective is to determine whether a filling level is above or below a specific point.

According to a preferred further development of the invention, the sound conductor has a means for influencing a sound coupling between the sound conductor and the liquid, wherein the means increases the surface area of the sound conductor, in particular in the form of ribs, fins or holes, and/or surface wrinkling. A sound conductor can also have a layered structure based on specific wavelengths, by means of which the sound impedance can be adjusted to the liquid, More precise measurements can be generated with both measures.

The sound can be in the form of a sweep and/or chirp signal. Alternatively, a hissing sound can be coupled into the sound conductor. A sweep signal is a signal with a temporally changing frequency, wherein the frequency periodically and continuously penetrates a predefined range. A chirp signal is a signal with a temporally changing frequency.

A container with a system for measuring a filling level, such as those described above, is understood to be advantageous. The container can be an oil tank for a vehicle in particular.

CONTENTS OF THE DRAWINGS

The present invention shall be explained in greater detail below based on the exemplary embodiments shown in the schematic figures, Therein:

Figure 5A:
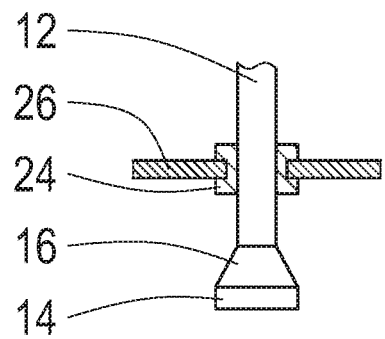
Figure 6A:
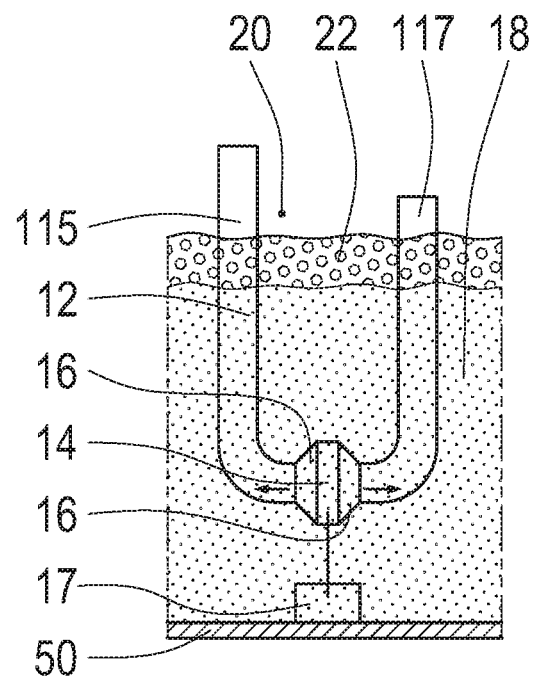
Figure 7:
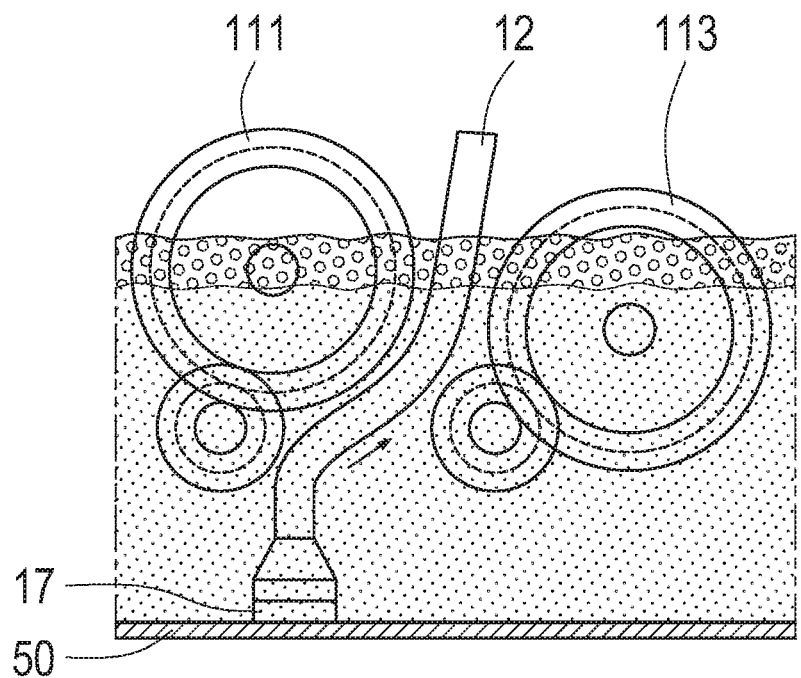
Figure 9:
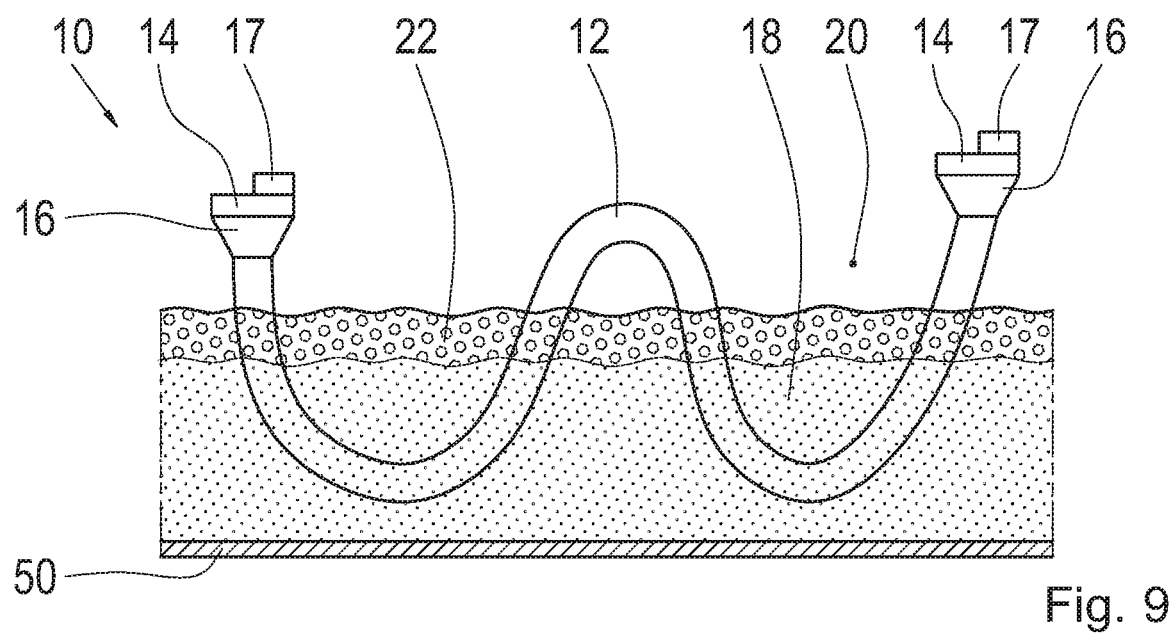
Figure 10:
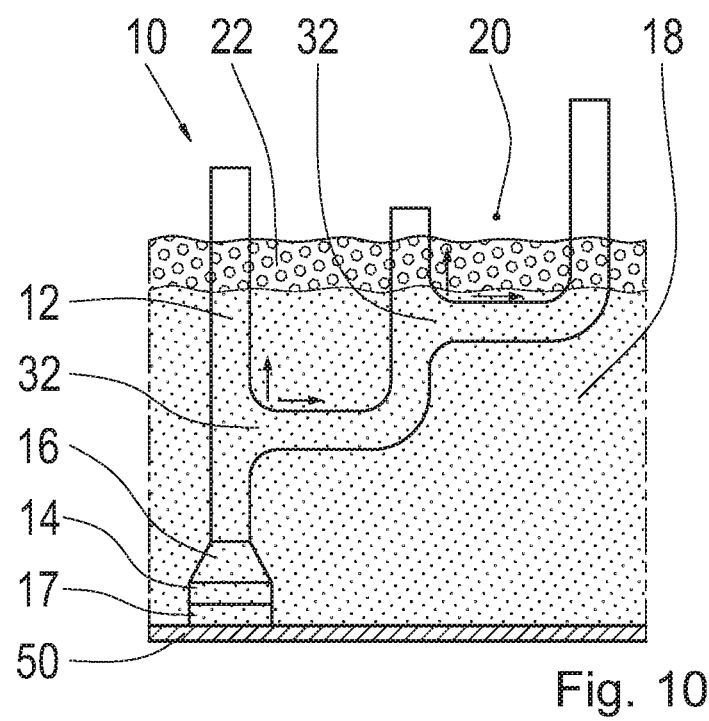
Figure 11:
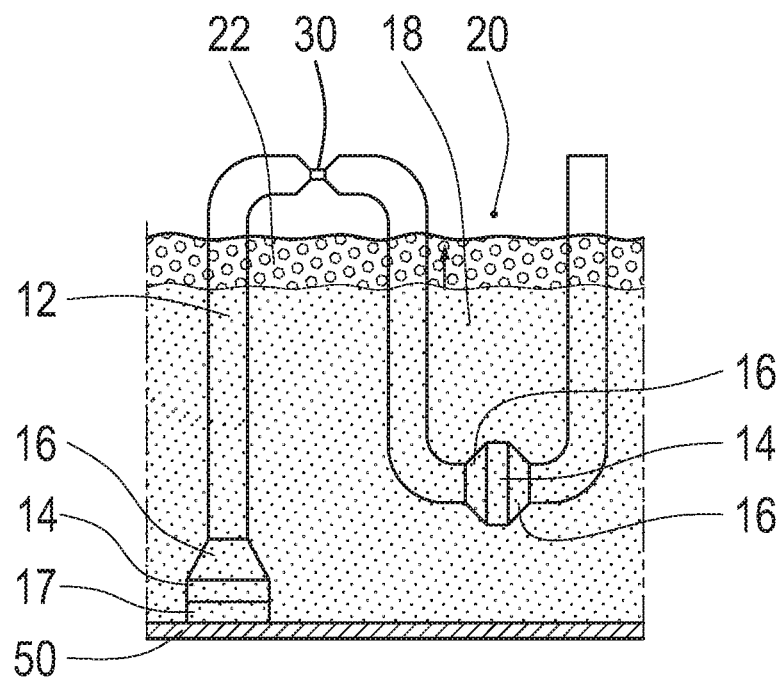
Figure 12:
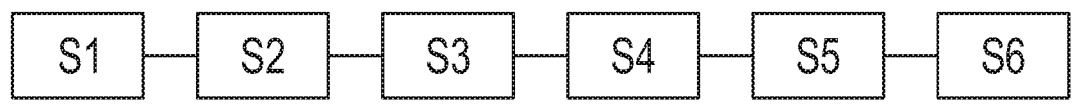

FIGS. 5A, B each show a schematic diagram of an embodiment of the invention;

FIGS. 6A, B each show a schematic diagram of an embodiment of the invention;

FIG. 7 shows a schematic diagram of an embodiment of the invention;

FIGS. 8A-D each show a schematic diagram of an embodiment of the invention;

FIG. 9 shows a schematic diagram of an embodiment of the invention;

FIG. 10 shows a schematic diagram of an embodiment of the invention;

FIG. 11 shows a schematic diagram of an embodiment of the invention;

FIG. 12 shows a schematic block diagram of an embodiment of the invention;

The various drawings are intended to provide a further understanding of the embodiments of the invention. They illustrate embodiments and are used in conjunction with the description to explain principles and concepts of the invention, Other embodiments and many of the specified advantages can be derived in reference to the drawings. The elements of the drawings are not necessarily drawn to scale.

Identical elements, features and components having the same functions and acting in the same manner are provided with the same reference symbols, as long as not otherwise stated.

DESCRIPTION OF EXEMPLARY EMBODIMENTS

The functioning of the system 10 for measuring a filling level based on runtime measurements shall be described in reference to the drawings. It is understood that the alternatives, spectroscopy and interferometry, are the same as runtime measurement, as explained above.

The embodiments in the drawings each have a sound transmitter/receiver, thus a device that both transmits and receives sound.

It should be understood that a sound transmitter can also be separate from a sound receiver.

Figure 1:
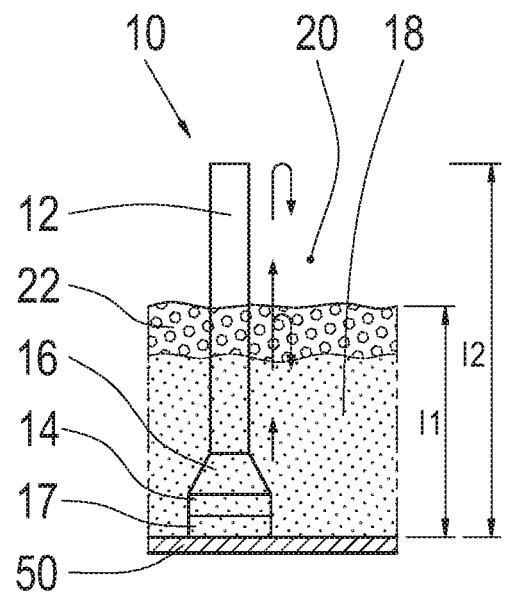
FIG. 1 shows a schematic diagram of an embodiment of the invention.

FIG. 1 shows a schematic diagram of a system 10 for measuring a filling level, the sound receiver 14 and vibration sensor 16 of which are placed in a liquid 18 in a container. The system 10 for measuring a filling level comprises a sound conductor 12, a vibration sensor 16 and an evaluation unit 17. A foam 22 is formed on the boundary surface of the liquid 18. The filling level of the liquid 18 is indicated by 11 in FIG. 1. The overall height of the container 50, or the overall length of the sound conductor 12 is indicated by 12 in FIG. 1.

It is illustrated in FIG. 1 that sound from the sound transmitter/receiver 14 is coupled into the sound conductor 12, and the sound is partially reflected at the boundary surface of the liquid 18, and partially conducted through the sound conductor 12. The sound that is not reflected at the boundary surface of the liquid 18 is reflected back to the sound transmitter/receiver 14 at the end of the sound conductor 12.

Figure 2:
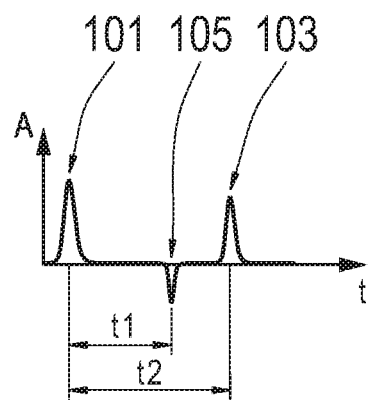
FIG. 2 shows a schematic pulse diagram for an embodiment of the invention.

FIG. 2 shows a pulse diagram relating to FIG. 1. The amplitude A is plotted in the pulse diagram on the y-axis over time t on the x-axis. The pulse 101 is the transmission pulse, as it is emitted by the sound transmitter/receiver 14. The pulse 105 is the pulse as it is reflected at the boundary surface of the liquid 18, at the filling level 11. The pulse 103 is the pulse as it is reflected at the end of the sound conductor 12.

Figure 3:
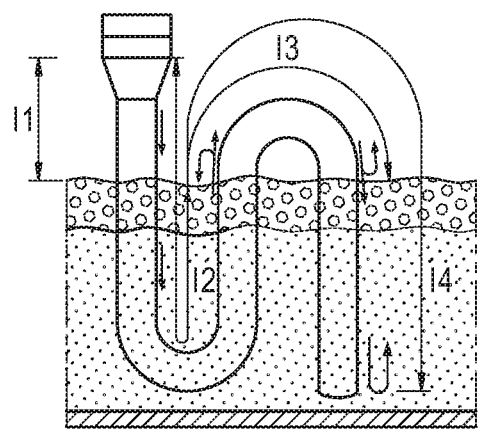
FIG. 3 shows a schematic diagram of an embodiment of the invention.

The system 10 for measuring a filling level according to FIG. 3 differs from the system 10 for measuring a filling level according to FIG. 1 in that the sound transmitter/receiver 14 and the vibration sensor 16 are not located in the liquid 18, but instead in the gas 20. The sound conductor 12 according to FIG. 3 is also S-shaped, while the sound conductor 12 according to FIG. 1 is straight. Accordingly, the sound conductor 12 according to FIG. 3 penetrates the liquid three times. The distance between the sound transmitter/receiver 14 and the first time it penetrates the liquid is indicated with 11. The distance between the sound receiver/transmitter 14 and the second time it penetrates the liquid is indicated with 12 in FIG. 3. The distance between the sound transmitter/receiver 14 and the third time it penetrates the liquid is indicated with 13 in FIG. 3. The distance between the sound transmitter/receiver 14 and the end of the sound conductor 12 is indicated with 14 in FIG. 3.

Figure 4:
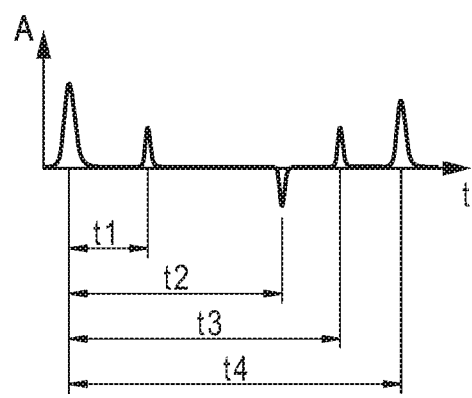
FIG. 4 shows a schematic pulse diagram for an embodiment of the invention.

The pulse diagram according to FIG. 4 relating to FIG. 3 corresponds to the pulse diagram in FIG. 2. Accordingly, five pulses can be seen in the pulse diagram according to FIG. 4 for FIG. 3. Pulse 101 is the transmission pulse, as it is emitted from the sound transmitter. Pulse 105 is the pulse as it is reflected at the first time it penetrates the liquid. Pulse 107 is the pulse as it is reflected at the second time it penetrates the liquid. Pulse 109 is the pulse as it is reflected at the third time in penetrates the liquid. The pulse 103 is the pulse as it is reflected at the end of the sound conductor 12.

Figure 5B:
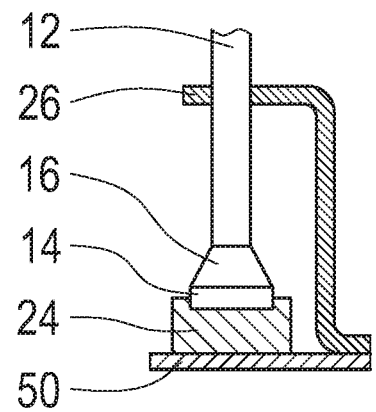

FIGS. 5A, B each show attachment possibilities for a sound conductor 12 in a container 50. The attachment means according to FIGS. 5A and 5B each have an attachment means 24 that prevents leakage of the measurement sound field. It is possible to take into account the relationship between the sound impedance of the materials with different sound speeds c, thus the density and compressibility. If the sound conductor is hard and heavy, for example, the coupling element should be significantly lighter and softer, and vice versa. For a sound conductor made of metal, attachment means made of plastic or rubber are ideal. For a sound conductor filled with air, heavy metals are more appropriate for the attachment means. If the operating frequency remains constant, interference effects that have different sound speeds or different sound impedances can also be exploited by means of sound conductors with coated materials. 1 is also possible to make use of damping effects (e.g., via internal friction or scattering), in order to reduce the acoustic coupling in a targeted manner. An attachment means also serves as a mechanical attachment, in particular when subjected to sloshing oil, currents or vibrations.

The attachment means 26 ensures that the sound conductor is sufficiently supported on the container 50.

Figure 6B:
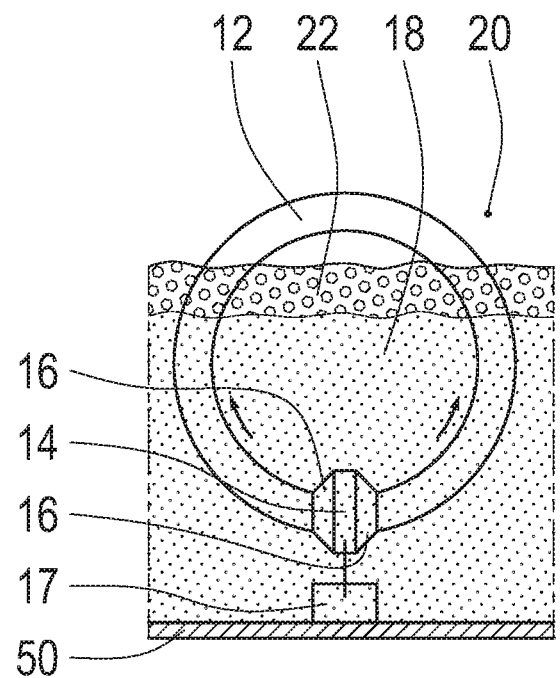

FIGS. 6A, 6B each show differently shaped sound conductors 12 in a container 50 filled with liquid 18 and gas 20.

The sound conductor is basically U-shaped in FIG. 6A, wherein the sound transmitter/receiver 14 is formed in the middle of the sound conductor, between two vibration sensors 16. Accordingly, sound from the sound transmitter/receiver 14 is coupled into both arms 115, 117 of the sound conductor 12. Accordingly, it is possible to determine which arm of the sound conductor 12 reflects a pulse.

The sound conductor 12 is annular in FIG. 6B, wherein the sound transmitter/receiver is formed between two vibration sensors 16.

FIG. 7 shows another embodiment of a sound conductor 12, which is curved. The sound conductor 12 is placed in a particularly space-saving manner between two drives 111 and 113 due to its curvature.

Figure 8A:
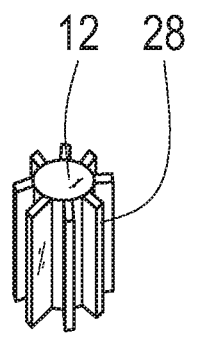
Figure 8B:
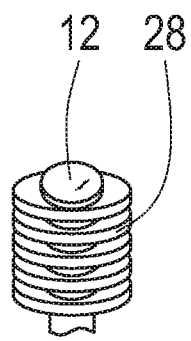
Figure 8C:
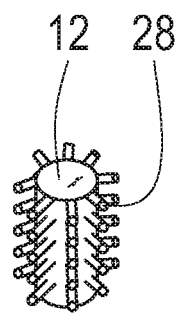
Figure 8D:
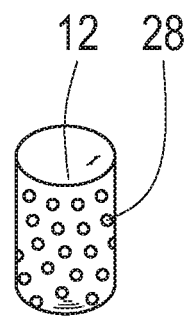

FIGS. 8A-D each show different means 28 used to manipulate the sound coupling. In FIG. 8A, these means 28 for manipulating the sound coupling are in the form of fins. In FIG. 8B, the means 28 for manipulating the sound coupling are in the form of ribs. In FIG. 8C, the means 28 for manipulating the sound coupling are in the form of spokes. In FIG. 8D, the means for manipulating the sound coupling are in the form of holes.

FIG. 9 shows another embodiment of a system 10 for measuring a filling level. The sound conductor 12 according to FIG. 9 is basically in the shape of a "W" and is connected at both ends to a vibration sensor 16 and a sound transmitter/receiver 14. In FIG. 9, the sound conductor 12 penetrates the liquid 18 in the container 50 four times.

FIG. 10 shows another embodiment of a system 10 for measuring a filling level. The sound conductor 12 according to FIG. 10 has two branches 32.

FIG. 11 shows a system 10 for measuring a filling level that is similar to that in FIG. 3, wherein the system 10 according to FIG. 11 has a first sound transmitter/receiver 14 and a first vibration sensor 16, which are located in the liquid 18. In the further course of the sound conductor 12, it has another sound transmitter/receiver 14, which is located between two vibration sensors 16 in the liquid 18. The sound conductor 12 according to FIG. 11 also has a longitudinal reference marker 30 in the form of a tapering.

FIG. 12 shows a schematic block diagram of a method for determining a filling level, comprising the steps S1 to S6. In step S1, a sound signal is generated by a sound transmitter, and a sound conductor is subjected to the sound signal. In step S2, the sound signal is received by a sound receiver, which is transported from the sound conductor to the sound receiver. In step S3, a distance between the sound transmitter and a boundary surface of the liquid is determined on the basis of the generated sound signal and the received sound signal. In step S4, the distance is evaluated with respect to the filling level of the container by an evaluation unit. In step S5, a natural frequency of the sound conductor is determined by a vibration sensor. In step S6, the natural frequency is evaluated with respect to a density of the liquid by the evaluation unit.

REFERENCE SYMBOLS 10 system for measuring a filling level
12 sound conductor
14 sound transmitter/receiver
16 vibration sensor
17 evaluation unit
18 liquid
20 gas
22 foam
24 attachment means
26 attachment means
28 means for manipulating the sound coupling
30 longitudinal reference marker
32 branching
50 container
101 transmitted pulse
103 reflected pulse
105 reflected pulse
107 reflected pulse
109 reflected pulse
111 gearing
113 gearing
115 arm
117 arm
11 distance
12 distance
13 distance
14 distance

The invention claimed is:

1. A system for measuring a filling level in a container for liquids that is to be installed in a vehicle, comprising a sound conductor, a vibration sensor for measuring a natural frequency of the sound conductor, a sound transmitter, comprising an ultrasound transmitter for subjecting the sound conductor to sound, a sound receiver for receiving sound from the sound conductor, and an evaluation unit, which has a data connection to the sound transmitter, the vibration sensor, and the sound receiver, wherein the evaluation unit is configured to determine a distance between the sound transmitter and a boundary surface of the liquid, and to evaluate the distance with regard to a filling level of the container, and to evaluate the natural frequency of the sound conductor with respect to a density of the liquid, wherein the sound conductor has at least one of a longitudinal reference marker or a means for manipulating a sound coupling between the sound conductor and the liquid, wherein the longitudinal reference marker has an effect on the natural frequency of the sound conductor, wherein the longitudinal reference marker is formed as a change in the cross section of the sound conductor, specifically as at least one of a tapering or a widening of the sound conductor, and wherein the means for manipulating a sound coupling between the sound conductor and the liquid results in an enlargement of the surface of the sound conductor and is formed as at least one of ribs, fins, holes, or a surface wrinkling.

2. The system for measuring a filling level according to claim 1, wherein the evaluation unit is configured to detect a runtime between when the sound conductor is subjected to the sound, and the reception of the sound from the sound conductor, and to evaluate the runtime with respect to the filling level of the container.

3. The system for measuring a filling level according to claim 1, wherein the sound conductor, the sound transmitter and the sound receiver can be placed in the container such that the sound is reflected on the boundary surface of the liquid to the sound receiver.

4. The system for measuring a filling level according to claim 1, wherein the sound transmitter is configured to subject the sound conductor to sounds of various frequencies, and the evaluation unit is configured to detect a change in the natural frequency of the sound conductor.

5. The system for measuring a filling level according to claim 1, wherein the evaluation unit is configured to evaluate a change in the natural frequency with regard to a foaming of the boundary surface of the liquid.

6. The system for measuring a filling level according to claim 1, wherein the sound conductor is at least one of in the form of a hollow conductor or made from a solid material.

7. The system for measuring a filling level according to claim 6, wherein the sound conductor is in the form of a hose or a tube, and can be placed in the container such that the sound conductor is in contact with the liquid at least one of inside or outside the sound conductor, when the container is filled with the liquid.

8. The system for measuring a filling level according to claim 1, wherein the sound conductor contains at least one of a metal or a crystalline substance.

9. The system for measuring a filling level according to claim 1, wherein the sound transmitter is configured to subject the sound conductor to at least one of compression waves, torsion waves, or surface waves.

10. The system for measuring a filling level according to claim 1, wherein the system for measuring a filling level comprises at least three sound conductors, at least three sound transmitters and at least three sound receivers which are configured to measure a filling level of the container at at least three measuring points.

11. The system for measuring a filling level according to claim 1, wherein the sound conductor has at least one branching.

12. The system for measuring a filling level according to claim 1, wherein the sound conductor is curved.

13. The system for measuring a filling level according to claim 1, which has an attachment means for attaching the sound conductor to the container at at least one attachment point, wherein the at least one attachment point is configured with regard to at least one of a coupling of interference waves outside the sound conductor or a decoupling of the sound to which the sound conductor is subjected.

14. A container with the system for measuring a filling level according to claim 1, which is designed as the oil tank for a vehicle.

15. A method for measuring a filling level of a liquid in a container, the method comprising:
generating a sound signal by a sound transmitter and subjecting a sound conductor to the sound signal;
receiving the sound signal by a sound receiver, which is transported from the sound conductor to the sound receiver;
determining a distance between the sound transmitter and a boundary surface of the liquid on the basis of the generated sound signal and the received sound signal;
evaluating the distance with regard to the filling level of the container by the evaluation unit;
determining a natural frequency of the sound conductor with a vibration sensor; and
evaluating the natural frequency with regard to a density of the liquid by the evaluation unit,
wherein the sound conductor has at least one of a longitudinal reference marker or a means for manipulating a sound coupling between the sound conductor and the liquid,
wherein the longitudinal reference marker has an effect on the natural frequency of the sound conductor, wherein the longitudinal reference marker is formed as a change in the cross section of the sound conductor, specifically as at least one of a tapering or a widening of the sound conductor, and
wherein the means for manipulating a sound coupling between the sound conductor and the liquid results in an enlargement of the surface of the sound conductor and is formed as at least one of ribs, fins, holes, or a surface wrinkling.

* * * * *